June 28, 1966   J. P. SILVERS   3,258,405
NUCLEAR REACTOR HYDROPULSE SYSTEM
Filed Aug. 22, 1961
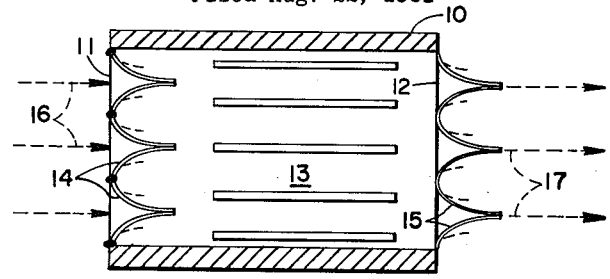
F̲I̲G̲ 1
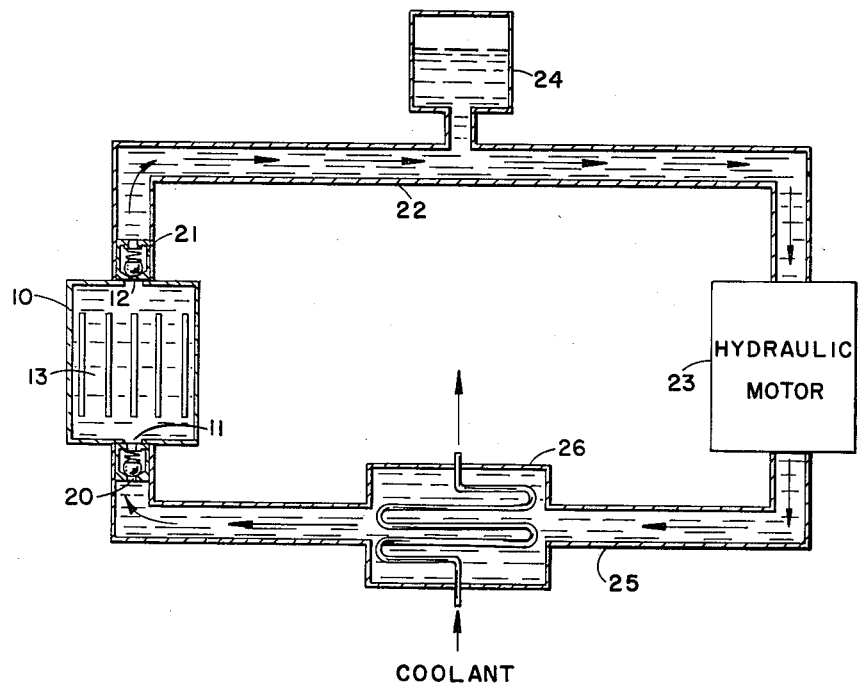
COOLANT
F̲I̲G̲ 2
JOHN P. SILVERS
*INVENTOR.*
BY Alden D. Redfield
Melvin E. Frederick
ATTORNEYS

United States Patent Office 3,258,405
Patented June 28, 1966

3,258,405
NUCLEAR REACTOR HYDROPULSE SYSTEM
John P. Silvers, North Wilmington, Mass., assignor to Avco Corporation, Cincinnati, Ohio, a corporation of Delaware
Filed Aug. 22, 1961, Ser. No. 133,182
3 Claims. (Cl. 176—65)

This invention relates generally to the nuclear reactor art and is particularly concerned with the production of flow of a fluid medium by development of a pulsing characteristic of a thermal, fluid-moderated nuclear reactor core.

As is now well known, by massing together sufficient fissionable material under appropriate conditions, a neutron reactive system may be formed, which system, by reason of its ability to generate neutrons at an equal or greater rate than they are being lost to the system as a result of absorption in the system or leakage from the system, is capable of maintaining a self-sustained chain reaction of neutron-induced fission. Such a system has been termed a nuclear reactor, or "pile." Since the general principles of design, operation, and control of such reactors have now been well publicized in the literature, a knowledge of such general principles will be assumed in what follows. Reference is made particularly to "The Science and Engineering of Nuclear Power," Addison-Wesley Press, Inc., Cambridge, Massachusetts, vol. I (1947) and vol. II (1949).

The operation of thermal reactors requires that the core have, in addition to a fuel assembly, a sufficient quantity of moderator. The moderator, while not entering directly into the fission reaction, is nevertheless necessary to the critical operation of the reactor. Because of this fact, the removal of moderator from the core constitutes a drastic decrease in reactivity. Thus, a fuel assembly which is inherently radically supercritical and immersed in a moderator will be reduced to a completely subcritical condition when all of the moderator is removed. Conversely, an inert fuel assembly can be made suddenly supercritical by the rapid addition of moderating material with a resulting excursion of power in the form of heat. The general principles of design, operation, and control of thermal reactors of the type contemplated by the present invention are described in "Experimental Investigation of the Self-Limitation of Power During Reactivity Transients in a Sub-Cooled, Water-Moderated Reactor," AECD 3668, 1955; "Design Study of Small Boiling Reactors for Power and Heat Production," ANL 5327 (Del.) 1957, and "The EBWR, Experimental Boiling Water Reactor," ANL, 5607, 1957.

A boiling reactor can be designed to have a high degree of inherent self-protection against the effects of sudden, large reactivity increases, such as those that might occur accidentally. This self-protection is the result of a negative "steam coefficient of reactivity" which can be designed into the reactor. Stating it another way, the reactor can be so designed that the extra steam content of the core which results from a power increase will reduce reactivity because of the displacement of water from the core and consequent loss in neutron moderation, and thereby limit the peak value of power surges to a safe value. The application of this principle of self-protection is not limited to reactors designed for normal operation as boilers, but holds also for other water-cooled, water-moderated reactors having negative steam coefficients of reactivity.

Thus, in accordance with the present invention, there is provided a thermal reactor fuel assembly immersible in a liquid moderator and enclosed within a pressure vessel having check valves at both the inlet and the outlet to control flow direction. The thermal reactor fuel assembly is comprised of canned fuel elements (a core of fuel alloy completely enclosed and bonded into a cladding of an inert protective metal) immersible in a suitable moderator. The moderator, such as, for example, water, serves as both moderator and coolant. The fuel assembly is in an inherently supercritical condition when immersed in a suitable moderator, such as, for example, water, and exhibits violent pulsing characteristics. The pulsing occurs because a very rapid power rise causes violent heating in the water moderator, and, consequently, a violent ejection of this water from the core, presumably because of the beginning of steam formation. Upon the ejection of the moderator, the core is rendered substantially instantaneously subcritical, and a very rapid power decay occurs. Thus, when the power excursion occurs, the moderator in the pressure vessel is ejected through the outlet valve only, and the resulting void in the pressure vessel and power decay in the core permits additional moderator to flow into the pressure vessel through the intake valve only. This action produces a pulsating flow in a fashion somewhat similar to that of a pulse jet engine.

Accordingly, it is a broad object of the present invention to provide an integral pulsing pump and power source of a very simple design.

Another object of the present invention is to provide a nuclear hydropulse that will perform pumping or propelling functions in remote locations which would be difficult to achieve by conventional methods.

A further object of the present invention is to provide a closed loop hydraulic system, such as a power generating system, which does not require a steam boiler, condenser, or turbine.

A still further object of the present invention is the provision of a relatively inexpensive, readily transportable power generation system, completely self-contained, that can be used in isolated places for either civilian or military application.

Another object of the present invention is to provide a device for the production of useful power, either mechanical or electrical, from a neutronic reaction, minimizing auxiliary apparatus needs, as well as weight and space requirements.

The novel features that are considered characteristic of this invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is a diagrammatic representation of a nuclear reactor illustrating the principles of the present invention; and FIGURE 2 is a schematic illustration of a closed loop hydraulic system in accordance with the present invention.

Referring now to FIGURE 1, reference numeral 10 designates a tubular pressure container having an inlet opening 11 and an outlet opening 12 which provide the moderator passageway to and away from the fuel assembly, generally designated by the numeral 13 and located within the pressure container 10. The pressure container 10 is provided at its inlet opening 11 with inlet check valves 14 that communicate with the source of moderator and outlet check valves 15 at its outlet opening 12 to control the direction of flow of moderator. Thus, the moderator can flow only from any suitable source (not shown) into the pressure container 10 through check valves 14 as indicated by arrows 16 and out of the pressure container only through check valves 15 as indicated by arrows 17.

The check valves 14 and 15 function as directional barriers located across the cross section of the pressure container between respectively the inlet opening 11 and the outlet opening 12 of the pressure container 10. The check valves 14 and 15 may comprise a number of parallel arranged channel barriers as indicated in FIGURE 1. These are generally U-shaped channel barriers, the ends of which are fastened within the periphery of the pressure container. The rounded bases of the barriers are directed toward the source of moderator, and the free ends of the barriers are directed toward the outlet opening of the pressure container. A space is provided between the sides of each parallel channel barrier through which moderator can flow to enter the pressure container at the inlet opening and to leave the pressure container at its outlet opening. The position of the free ends of the barriers is illustrated by the broken lines when moderator is flowing therethrough. Thus, when check valves 14 are closed, check valves 15 are open and vice versa.

The present invention is not limited to the check valves as shown and described, as other types are well known and may be used. For example, if desired, a flutter or blade valve system may be used comparable to the type used in conjunction with ram jet engines.

Since the design, operation and control of fuel assemblies for thermal operation are now well known, a detailed discussion is not considered necessary. Briefly, each fuel element may be comprised of a plurality of fuel plates containing, for example, 90% enrichment $U^{235}$. The $U^{235}$ in each plate may be in the form of a strip of uranium-aluminum alloy. Alternately, the fuel plates may be fabricated of uranium-beryllium alloy containing 5.55 weight percent of uranium, the uranium being enriched in the thermal neutron fissionable isotope $U^{235}$ to contain approximately 90% by weight $U^{235}$. The plates in this case are covered with a cladding of zirconium. The alloy plates may be covered with a cladding of aluminum zirconium, or other suitable cladding material.

The fuel elements are assembled in parallel relationship one with another and are disposed in the hollow pressure container 10 which may be fabricated of beryllium covered with zirconium in order to prevent reaction of the beryllium with water. The pressure container may function as a reflector and partially moderate the core. However, the fuel assemblies must be completely moderated when, and only when, they are immersed in a liquid moderator.

Thus, the core must be designed such that it is in an inherently supercritical condition when immersed in the fluid moderator and subcritical when it is not so immersed.

The fuel elements may be supported by grids in conventional manner to form four quadrants wherein control rods are operable in channels separating the four quadrants of the reactor core. The control rods may be made of nickel-clad cadmium in aluminum casings and actuated in conventional manner as may be required.

The fuel elements are positioned in the pressure container such that they are immersible in the moderator that flows into the container through its inlet port. Thus, if the fuel elements are vertically positioned the inlet port may be located at a point above the fuel elements. If the fuel elements are horizontally positioned as shown in FIGURE 1, the level of the moderator need only be kept sufficiently high that the uppermost fuel element will be covered with moderator.

As may now be evident, the inherent highly supercritical condition of the fuel elements when immersed in water causes a very rapid power rise in the reactor core. The power rise causes violent heating in the water moderator and, as a result thereof, the water is violently ejected from the core through the outlet opening 12. Upon ejection of the moderator from the pressure container the fuel assembly 13 is rendered substantially instantaneously subcritical and, consequently, a very rapid power decay occurs. The partial vacuum that forms as a result of the ejection of the moderator through the outlet opening 12 of the pressure container causes additional moderator to flow into the pressure container through the inlet opening 11 and and to substantially fill the pressure container. Thereafter, a second very rapid power rise occurs, and the cycle as described hereinabove is repeated. This action produces a pulsating flow through the pressure container in a fashion somewhat similar to that of a pulse jet engine.

Attention is now directed to FIGURE 2 which is a schematic illustration of a closed loop hydraulic system in accordance with the present invention. As illustrated in this figure, the nuclear hydropulse is comprised of a pressure container 10 having disposed therein a fuel assembly 13 as described in connection with FIGURE 1. The inlet and outlet check valves are illustrated as respectively ball check valves 20 and 21. Outlet ball check valve 21 is located at the outlet opening 12 of the pressure container 10 and communicates with a pipe 22 for supplying moderator to a hydraulic motor 23 of, for example, either the gear or piston type. A surge tank 24 in communication with pipe 22 is provided intermediate ball check valve 21 and the hydraulic motor 23 to provide a substantially even supply of moderator to the hydraulic motor 23. A heat exchanger 26 is interposed in pipe 25 intermediate the hydraulic motor 23 and inlet ball check valve 20, which is provided at the outlet opening 11 of the pressure container 10. Pipe 25 permits the return of moderator to the fuel assembly 13, and the heat exchanger 24 functions to maintain the moderator supplied to the fuel assembly 13 at ambient temperature. The above-described elements comprise a closed loop through which moderator circulates, driven by the nuclear hydropulse. The hydraulic motor may, for example, be utilized to drive an electric generator, or alternately, to perform mechanical work if so desired.

The present invention is not limited to the use of a core comprising a plurality of parallel, elongated fuel elements. For example, it is now well known that the core of a reactor may take any one of several forms, depending on a number of design factors. Thus, the core may be comprised of a bed of pebbles or the like or a suitably impregnated porous material so long as fluid flow passages having a sufficient cross section are provided in the core to permit the admission, heating, and ejection of moderator as and for the purpose hereinbefore set forth without excessive heating of the core or damage to the core by heating of the moderator within the core.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim.

1. In an arrangement for generating rotational power the combination comprising: a nuclear reactor having a fluid inlet opening, a fluid outlet opening, and a core, said core comprising a plurality of parallel, elongated fuel elements defining a plurality of fluid passages therebetween, said fuel elements being subcritical in the absence of a liquid moderator and sufficiently critical in the presence of a liquid moderator to cause a very rapid power rise, concomitant violent heating in the moderator and consequent high pressure in said reactor; a source of liquid moderator; first means for permitting moderator to flow into said core when it is subcritical; second means for permitting moderator to flow out of said core when it is critical; a hydraulic motor having a fluid inlet and outlet opening; first fluid conduit means interconnecting said reactor fluid outlet opening and said hydraulic motor fluid inlet opening for supplying liquid moderator to said hydraulic motor; a surge tank in communication with said first fluid conduit means; second fluid conduit means coupling said hydraulic motor fluid outlet opening and said reactor inlet opening for supplying liquid moderator to said reactor; and heat exchanger means interposed in said second fluid conduit means for removing heat from said liquid moderator.

2. In an arrangement for generating rotational power the combination comprising: a nuclear reactor having a fluid inlet opening, a fluid outlet opening, and a core, said core comprising a plurality of parallel, elongated fuel elements defining a plurality of fluid passages therebetween, said fuel elements being subcritical in the absence of a liquid moderator and sufficiently critical in the presence of a liquid moderator to cause a very rapid power rise and concomitant violent heating in the moderator, said fuel elements being constructed of an alloy including enriched uranium; a source of liquid moderator; first means for permitting moderator to flow into said core when it is subcritical; second means for permitting moderator to flow out of said core when it is critical; a hydraulic motor having a fluid inlet and outlet opening; first fluid conduit means interconnecting said reactor fluid outlet opening and said hydraulic motor fluid inlet opening for supplying liquid moderator to said hydraulic motor; a surge tank in communication with said first fluid conduit means; second fluid conduit means coupling said hydraulic motor fluid outlet opening and said reactor inlet opening for supplying liquid moderator to said reactor; and heat exchanger means interposed in said second fluid conduit means for removing heat from said liquid moderator whereby the flow of moderator into said core causes a very rapid power rise and concomitant violent heating in the moderator as the result of nuclear reaction, thereby ejecting moderator from said container through said second means whereafter moderator flows through said hydraulic motor and into said core through said first means to repeat the cycle.

3. In an arrangement for generating rotational power the combination comprising: a hollow, heat resistant pressure container having an inlet opening and an outlet opening; a plurality of parallel, elongated fuel elements defining a plurality of fluid passages therebetween, said fuel elements being subcritical in the absence of a liquid moderator and radically supercritical in the presence of a liquid moderator to cause a very rapid power rise and concomitant violent heating in the moderator, said fuel elements being constructed of an alloy including enriched uranium; a source of liquid moderator; a hydraulic motor having a fluid inlet and outlet opening; first fluid conduit means interconnecting said container fluid outlet opening and said hydraulic motor fluid inlet opening for supplying liquid moderator to said hydraulic motor; a surge tank in communication with said first fluid conduit means; second fluid conduit means coupling said hydraulic motor fluid outlet opening and said container inlet opening for supplying liquid moderator to said container; heat exchanger means interposed in said second fluid conduit means for removing heat from said liquid moderator; inlet check valve means disposed at the inlet opening of said container for allowing moderator to flow substantially only into said container; and outlet check valve means disposed at the outlet opening of said container for allowing moderator to flow substantially only out of said container whereby the supply of moderator to said container causes a very rapid power rise and concomitant violent heating in the moderator as the result of nuclear reaction, thereby ejecting moderator from said container through said outlet check valve means whereafter moderator flows through said hydraulic motor and into said container through said inlet check valve means to repeat the cycle.

References Cited by the Examiner
UNITED STATES PATENTS
2,875,143   2/1959   Froman _____ 204—193.2

OTHER REFERENCES

Glasstone: "Principles of Nuclear Reactor Engineering," 1955, published by Van Nostrand Co., pp. 820–823.

Truxal: "Control Engineer's Handbook," 1958, published by McGraw-Hill Book Co., pp. 15–18.

Kramer: "Boiling Water Reactors," published 1958 by Addison-Wesley Co.

AEC documents: AECD–3668, 1954; ANL–5327, 1954; ANL–5607, 1957.

LEON D. ROSDOL, *Primary Examiner.*

REUBEN EPSTEIN, CARL D. QUARFORTH,
*Examiners.*

M. R. DINNIN, L. D. RUTLEDGE,
*Assistant Examiners.*